(No Model.)
4 Sheets—Sheet 1.

J. J. LEFEBER.
COW MILKING MACHINE.

No. 396,577. Patented Jan. 22, 1889.

Witnesses
Geo. W. Young,
N. E. Oliphant.

Inventor,
John J. Lefeber
By Stout & Underwood
Attorneys (No Model.) 4 Sheets—Sheet 2.
J. J. LEFEBER.
COW MILKING MACHINE.
No. 396,577. Patented Jan. 22, 1889.
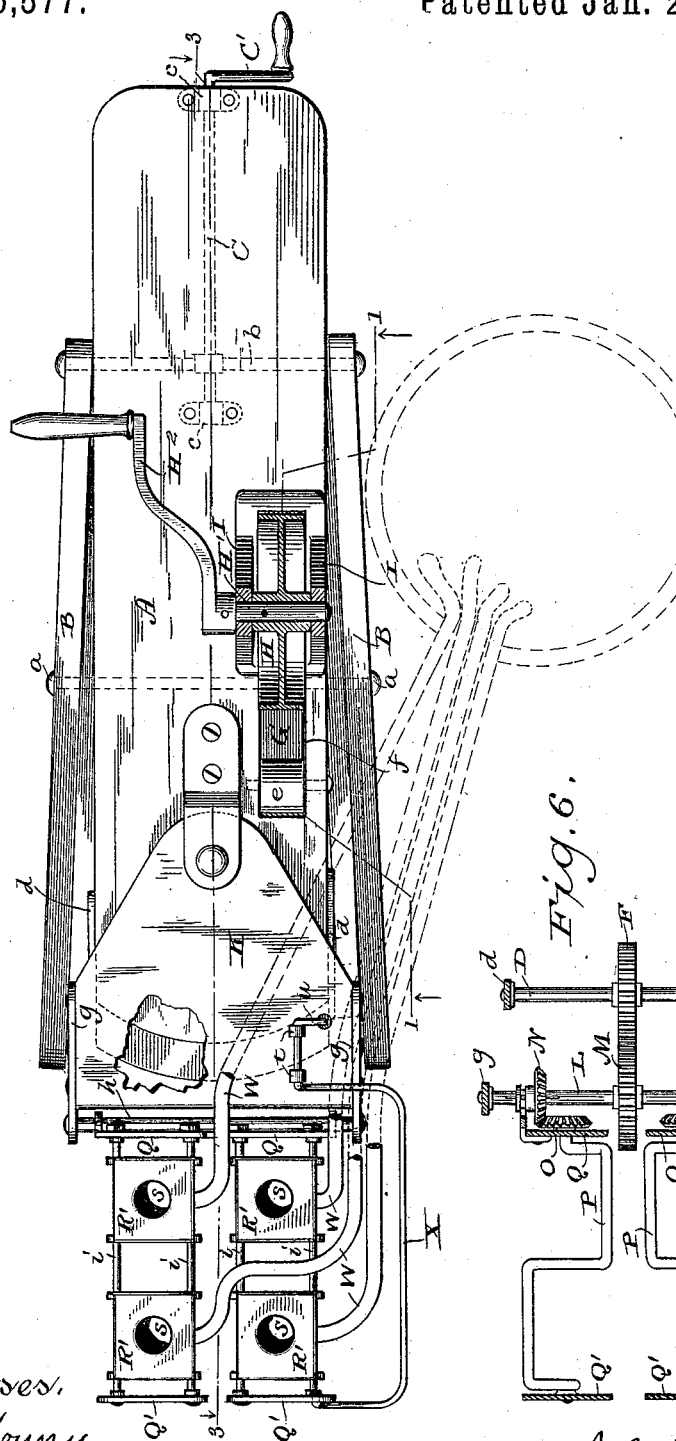
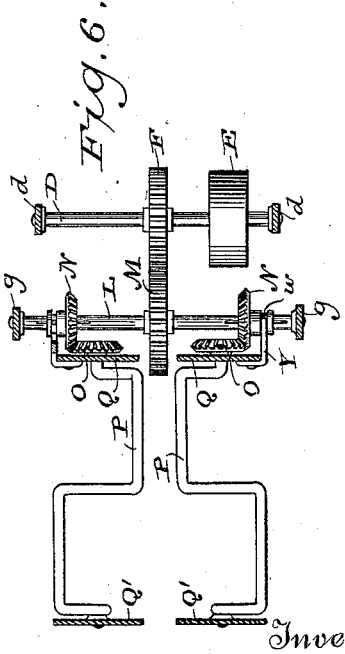
Witnesses:
Geo. W. Young.
N. E. Oliphant.
Inventor
John J. Lefeber
By Stout & Underwood
Attorneys

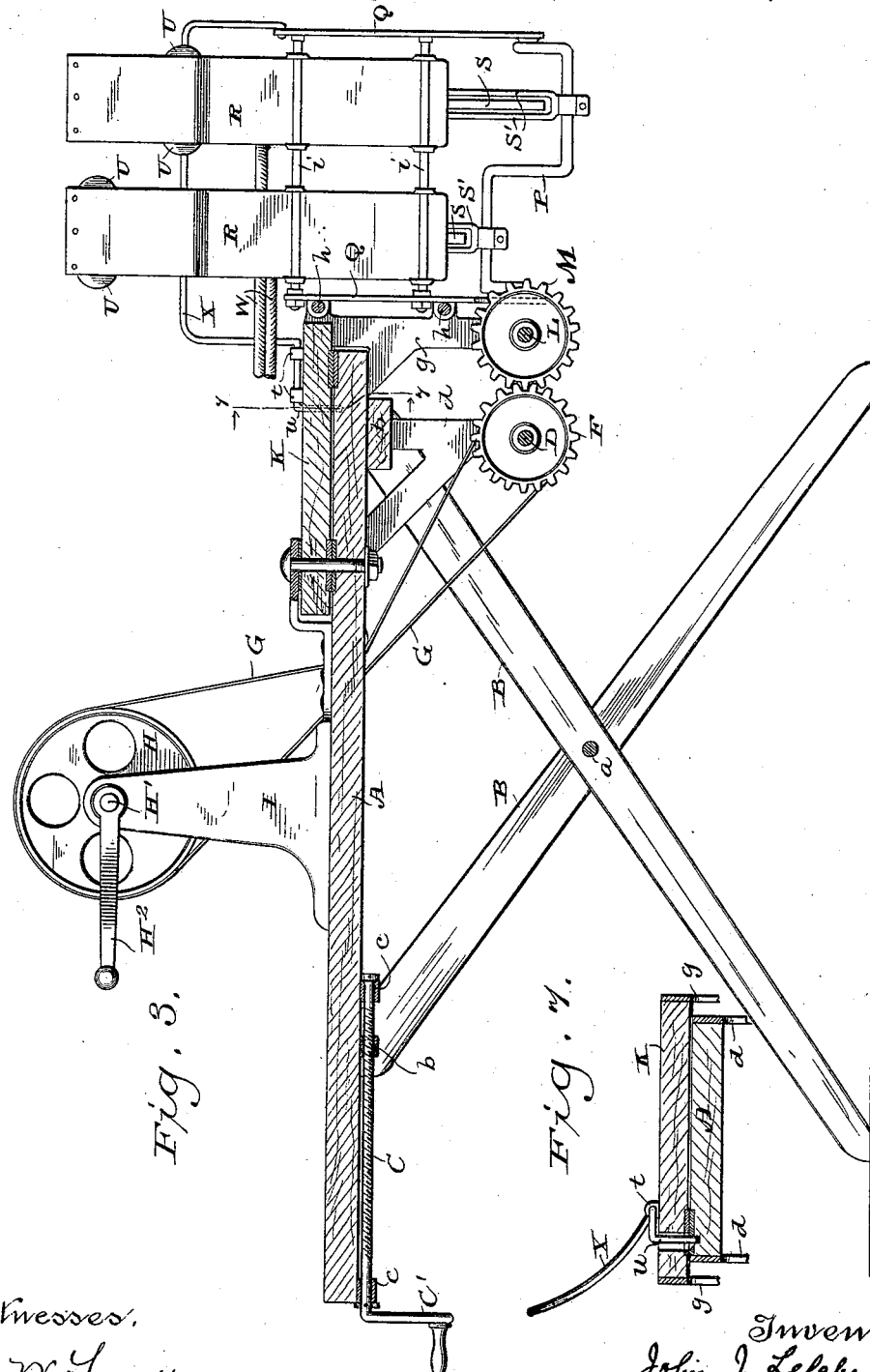

(No Model.) 4 Sheets—Sheet 4.

J. J. LEFEBER.
COW MILKING MACHINE.

No. 396,577. Patented Jan. 22, 1889.

Witnesses:
Geo. W. Young,
N. E. Oliphant

Inventor:
John J. Lefeber
By Stout & Underwood
Attorneys

UNITED STATES PATENT OFFICE.

JOHN J. LEFEBER, OF JONESBURG, WISCONSIN.

COW-MILKING MACHINE.

SPECIFICATION forming part of Letters Patent No. 396,577, dated January 22, 1889.

Application filed August 24, 1888. Serial No. 283,639. (No model.)

*To all whom it may concern:*

Be it known that I, JOHN J. LEFEBER, of Jonesburg, in the county of Fond du Lac, and in the State of Wisconsin, have invented certain new and useful Improvements in Cow-Milking Machines; and I do hereby declare that the following is a full, clear, and exact description thereof.

My invention relates to cow-milking machines; and it consists in certain peculiarities of construction and combination of parts, to be hereinafter described with reference to the accompanying drawings, and subsequently claimed.

Figure 1:
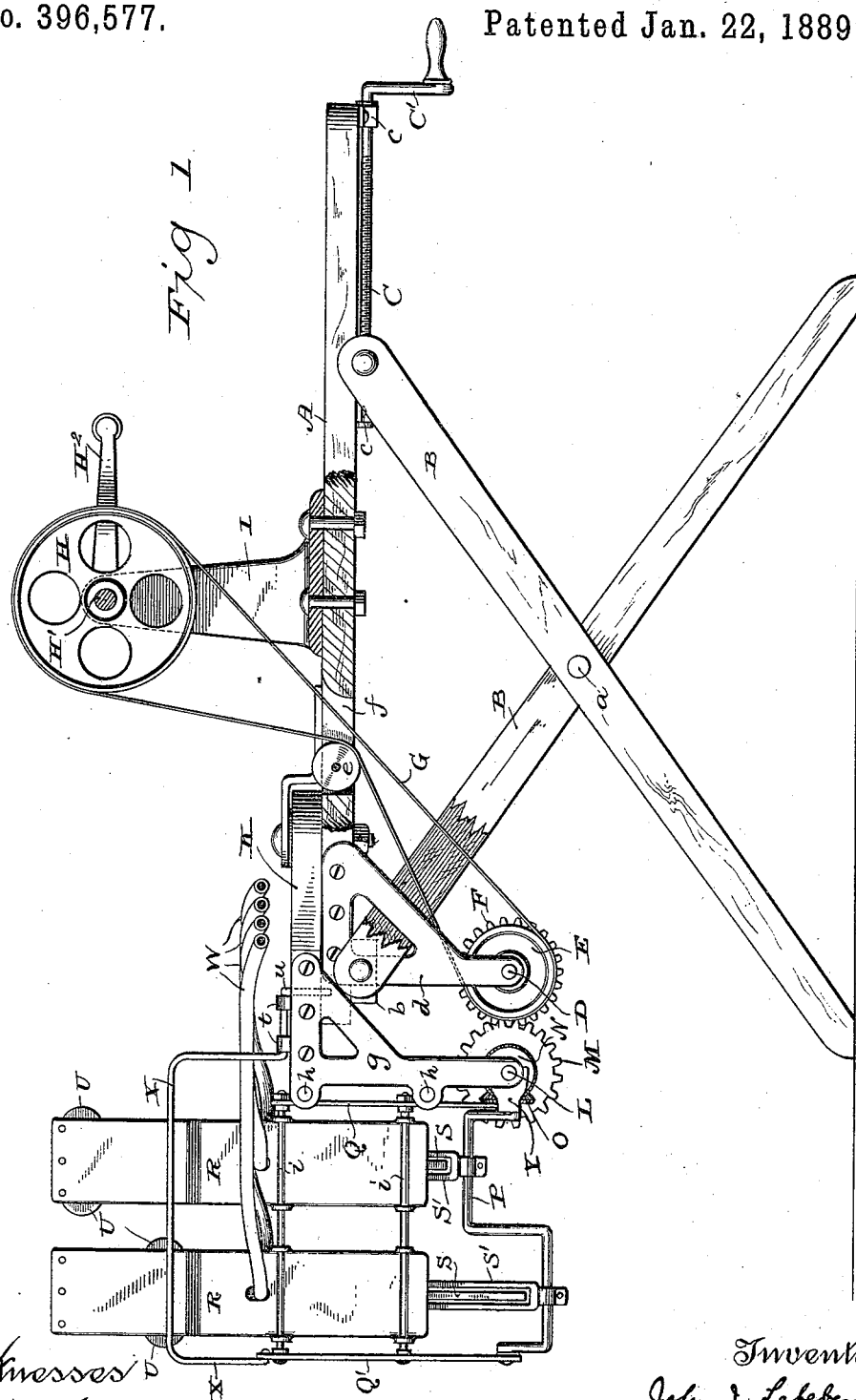
Figure 5:
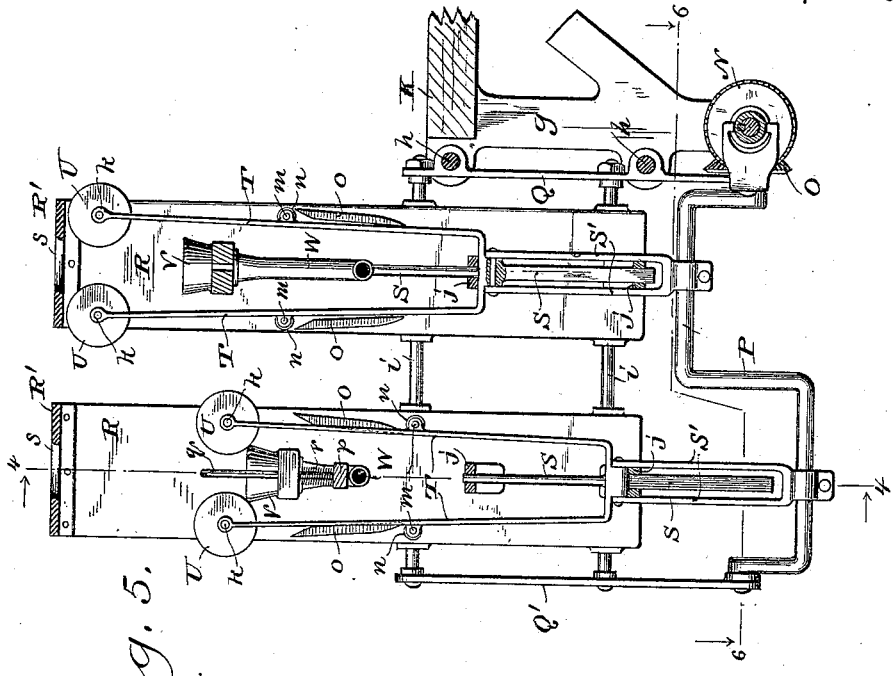
Figure 4:
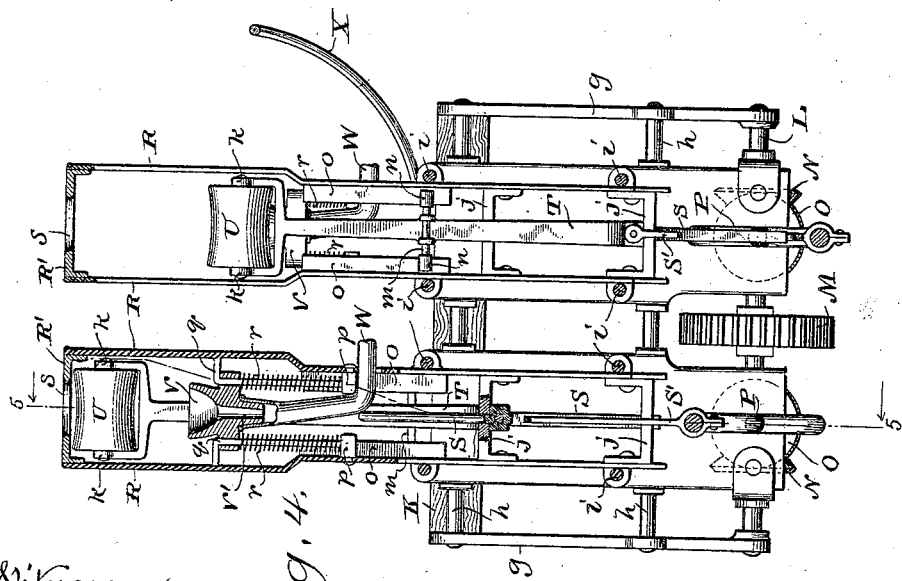

In the drawings, Figure 1 represents a side elevation of my machine with parts broken away on line 1 1 of Fig. 2; Fig. 2, a plan view of the same with parts broken away; Fig. 3, a vertical longitudinal section taken on line 3 3, Fig. 2; Fig. 4, a detail vertical transverse section taken on line 4 4, Fig. 5; Fig. 5, a detail vertical longitudinal section taken on line 5 5 of Fig. 4; Fig. 6, a detail horizontal section taken on line 6 6 of Fig. 5, and Fig. 7 a vertical transverse section taken on line 7 7 of Fig. 3.

Referring by letter to the drawings, A represents a horizontal base supported on four legs, B, that cross each other in pairs and are all pivotally united at or near their centers by means of a rod, $a$, the upper ends of these legs being individually pivoted to cleats $b$ upon the under side of said base. A screw, C, provided with a crank, C', is journaled in bearings $c$ upon the under side of the base A, and is engaged by a screw-threaded opening in the rear one of the cleats $b$. Now, if the screw C be turned in either direction its action will cause the cleat in engagement therewith to travel in or out, and consequently the legs B will move on their pivots to raise or lower the base A to the desired elevation, the adjustment just described being positive and easily effected.

Depending from the sides of the base A at its front end are bearings $d$ for a shaft, D, that has a pulley, E, and gear-wheel F fast thereon. A belt, G, passes around the pulley E and up under a roller, $e$, journaled in a slot, $f$, in the base A, and said belt is finally passed around a driving-pulley, H, that has its shaft H' journaled in standards I, supported on said base, the shaft H' being provided with a crank, H².

Pivotally connected to the forward end of the base A is an extension or table, K, and depending from the sides at the front end of this table are bearings $g$ for a shaft, L, having fast thereon a gear-wheel, M, that meshes with the gear-wheel F on shaft D. The shaft L also carries two bevel gear-wheels, N, that 60 mesh with similar wheels, O, on crank-shafts P, that have their bearings in plates Q Q', the plates Q being loosely clipped to rods $h$, that unite the bearings $g$, and coupled to the plates Q' by other rods, $i$, as plainly illustrated in Figs. 1, 2, and 3.

Loosely clipped to the rods $i$ are plates R, and these plates are united in pairs by guide-blocks $j$ for loose rods S, connected to the crank-shafts P by means of links S', as best illustrated in Figs. 4 and 5. Fast on the loose rods S are opposing spring-plates T, that are bifurcated at their upper ends to form bearings $k$ for elastic rollers U, and clipped to said spring-plates are the spindles $m$ for anti-friction rollers $n$, the latter being designed to work on short tracks $o$, that project in from the plates R and are set at an angle to a vertical plane, said tracks having oppositely-beveled ends, as best illustrated in Figs. 4 and 5.

Blocks $p$ project from the plates R and serve as supports for angle-rods $q$, that have their upper ends connected to said plates. Arranged on the angle-rods $q$ are spiral springs $r$, that impinge against cups V, the latter being free to slide on said angle-rods, and are provided with nipples V' for flexible tubes W, that extend through slots in the plates R, and are designed to enter a pail or other receptacle, as shown by dotted lines. Fig. 2. Above the cups V the plates R in each pair are united by a transverse piece, R', having a central opening or guide, $s$, for a cow-teat, said opening being in line with the adjacent cup V.

A guard-rail, X, has one of its ends pivoted to the front plate, Q', on the inner or rear side of the machine, and the other end of said rail is cranked and arranged in bearings $t$ on the table K. The inner terminus, $u$, of the guide-rail X passes through the table K and enters an opening in the base A, as illustrated in detail, Fig. 7, to serve as a latch, whereby said table and base are normally locked together to keep the wheels F M in gear. Now, suppose a cow being milked should start to move away. Her hind legs would strike against the guard-rail X and cause the latter to rock in its bearings to unlatch the base A and table K, thereby leaving the latter free to swing on its pivot as the cow moves forward. The operation just described will throw the gear-wheels F M out of gear, and consequently stop the action of all milking-rollers U, thereby preventing accident to the machine or injury to the animal.

To milk a cow, the machine is so arranged that the teats of said cow can be readily inserted in the openings s in the transverse pieces that unite the plates R. The operator sits on the base A and by turning the crank H² drives the pulley H, and thereby, through the belt G and gear-wheels F M, communicates motion to the shaft L, and the latter, through the medium of the bevel gear-wheels N O, drives the crank-shafts P. The crank-shafts, through their link-connections S' with the slide-rods S, impart a reciprocative motion to the spring-plates T, that are fast on said slide-rods. As the spring-plates move up, the anti-friction rollers n come in contact with the tracks o, and said spring-plates are thus spread apart until said anti-friction rollers pass out of contact with said tracks. When the rollers n pass out of contact with the tracks o, the spring-plates T automatically return to their normal position, and thus each pair of the elastic rolls U is brought against the adjacent cow-teat, and said rolls come inside of said tracks. Now as the spring-plates are drawn down a pressure is exerted to draw milk from the teats with which the elastic rolls are in contact, said milk being received in the cups V and delivered through the nipples V' and tubes W to a pail or other receptacle adjacent to the machine. As the cow-teats are lengthened by the pressure of the rolls U, the springs r permit a yield of the cups V and automatically return said cups to their normal position after the pressure is removed from said teats.

By means of the crank-shafts P the spring-plates T are so actuated that two of four teats are being operated upon while the remaining two are at rest, or, in other words, the action of the machine is alternate on each two of said teats.

As the distance between teats varies on different cows, I provide for an adjustment that will accommodate my machine to such variation, this adjustment consisting in having the plates Q loosely clipped to the rods h and the plates R similarly connected to the rods i, whereby said plates and the several minor parts connected thereto can be moved along said rods to the desired position. When the plates Q are adjusted as above described, the bevel gear-wheels N must also move on the shaft L, and to this end I provide said plates with spanners Y, that engage annular grooves w in the hubs of said bevel gear-wheels, the latter being feathered on their shaft, as best illustrated in Fig. 6. By the construction just described it will be seen that the bevel gear-wheels N O are always in mesh and move together when the plates Q are adjusted, while at the same time the links S' are free to move on the crank-shafts P when the plates R are adjusted on the rods i, as previously explained.

Having thus fully described my invention, what I claim as new, and desire to secure by Letters Patent, is—

1. In a cow-milking machine, the combination of a milking apparatus, a supporting-base having front and rear cleats upon its under side, four legs that cross each other in pairs and are pivoted together at their crossing-points and individually pivoted at their upper ends to the cleats, and a screw-threaded adjusting-rod having its bearings on said base and engaged by a screw-threaded opening in the rear one of said cleats, substantially as set forth.

2. In a cow-milking machine, the combination of a supporting-base, a shaft having its bearings thereon and carrying a gear-wheel, means, substantially as described, for driving the shaft, a table pivoted to the base to have a lateral movement with relation thereto, a latch for locking said base and table together, a shaft having its bearings on the table and provided with a gear-wheel arranged to mesh with the gear-wheel on the base-shaft, and a milking apparatus carried by the table and geared to the shaft thereon, as set forth.

3. In a cow-milking machine, the combination of a supporting-base, a shaft having its bearings thereon and carrying a gear-wheel, means, substantially as described, for driving the shaft, a table pivoted to the base, a pivotal guard-rail having one end thereof arranged to serve as a latch for locking said base and table together, a shaft having its bearings on the table and provided with a gear-wheel arranged to mesh with the gear-wheel on the base-shaft, and a milking apparatus carried by the table and geared to the shaft thereon, as set forth.

4. In a milking-machine, the combination, with a supporting-base and driving mechanism, of spring-plates connected to the driving mechanism to be reciprocated thereby, opposing pressure-rollers carried by the spring-plates, anti-friction rollers carried by said spring-plates, and inclined tracks arranged in the path of the anti-friction rollers, substantially as and for the purpose set forth.

5. In a cow-milking machine, the combination, with a supporting-base and driving mechanism, of spring-plates connected to the driving mechanism to be reciprocated thereby, opposing pressure-rollers carried by the spring-plates, anti-friction rollers carried by said spring-plates, inclined tracks arranged in the path of the anti-friction rollers, and spouted cups arranged beneath each pair of pressure-rollers, substantially as and for the purpose set forth.

6. In a cow-milking machine, the combination, with a supporting-base and driving mechanism, of spring-plates arranged in pairs, crank-shafts geared to the driving mechanism, sliding rods fast to the spring-plates and linked to the crank-shafts, opposing pressure-rollers journaled to said spring-plates, and anti-friction rollers carried by said spring-plates, and inclined tracks arranged in the path of the anti-friction rollers, substantially as and for the purpose set forth.

7. In a cow-milking machine, the combination, with a supporting-base and driving mechanism, of spring-plates arranged in pairs, crank-shafts geared to the driving mechanism, sliding rods fast to the spring-plates and linked to the crank-shafts, opposing rollers journaled to said spring-splates, means, substantially as described, for compressing the latter at predetermined intervals, spring-supported cups, and spouts leading therefrom, as and for the purpose set forth.

8. In a cow-milking machine, the combination, with a supporting-base and driving mechanism, of spring-plates connected to the driving mechanism to be reciprocated thereby, opposing pressure-rollers carried by the spring-plates, anti-friction rollers, also carried by said spring-plates, and tracks for the anti-friction rollers arranged at an angle to a vertical plane and having oppositely-beveled ends, substantially as and for the purpose set forth.

9. In a cow-milking machine, the combination of a base, A, table K, pivoted thereto, the guard-rail X, having the latch end $u$, for engaging the base and table, the plates Q, Q', and R, the transverse teat-guides R', the tracks $o$ on the plates R, the sliding rods S, links S', and crank-shafts P, the spring-plates T, carrying rollers U, the spring-supported cups V, and a driving mechanism geared to said crank-shafts, substantially as set forth.

10. In a cow-milking machine, the combination of the plates Q Q', connected by longitudinal rods $i$, and said plates Q loosely arranged on transverse rods $h$, the plates R, loosely arranged on the rods $i$, the reciprocating spring-plates T, carrying rollers U, means, substantially as described, for compressing said plates at predetermined intervals, and driving mechanism, as and for the purpose set forth.

11. In a cow-milking machine, the combination of the adjustable plates Q R, the spring-plates T, carrying rollers U and connected to sliding rods S, means, substantially as described, for compressing said spring-plates at predetermined intervals, crank-shafts P, linked to said sliding rods and provided with the bevel gear-wheels O, the bevel gear-wheels N, adjustably arranged on a shaft, L, and in mesh with said gear-wheels O, and a driving mechanism, substantially as described, geared to the shaft L, as and for the purpose set forth.

In testimony that I claim the foregoing I have hereunto set my hand, at Calvary, in the county of Fond du Lac and State of Wisconsin, in the presence of two witnesses.

JOHN J. LEFEBER.

Witnesses:
GEO. BRAUN,
FRANK BEAN.